UNITED STATES PATENT OFFICE.

ST. JULIEN RAVENEL, OF CHARLESTON, SOUTH CAROLINA.

IMPROVEMENT IN ARTIFICIAL STONE.

Specification forming part of Letters Patent No. 15,526, dated August 12, 1856; Reissue No. 402, dated October 14, 1856.

*To all whom it may concern:*

Be it known that I, ST. JULIEN RAVENEL, of the city and district of Charleston, and State of South Carolina, have invented a new and useful artificial composition to be used as a substitute for stone, bricks, &c.; and I do hereby declare that the following is a full and exact description of the method of compounding the same.

I employ as the principal ingredient any of the ordinary marls, which are found very abundantly in various sections of the United States. Marl is composed of the three main ingredients—carbonate of lime, silicious sand, and clay, in very variable proportions; but the proportions of their ingredients commonly vary within the following limits: carbonate of lime, from fifty to eighty per cent.; sand, from ten to fifty per cent.; clay, from two to twenty per cent.; and any marls containing said ingredients in proportions within these limits are suitable to mix with the lime in the proportions hereinafter stated. To the marl I add from ten to thirty per cent. of slaked lime, more or less. Any proportion of the marl and lime within or even outside of these limits may be employed, and produce a good result; but on account of the much greater cost of lime it is desirable to employ as small a proportion thereof as will answer the purpose. I find, therefore, that ten per cent., or thereabout, of the lime is the best proportion, all things considered. Even less would answer if the material should be well mixed, so as to become thoroughly homogeneous. The mixture, having been finely pulverized, is moistened with sufficient water to give it the proper consistency for molding. It is then formed in molds with pressure sufficient to unite the particles and enable the blocks to retain their shape after being removed from the molds. When they have been exposed a few days to the atmosphere, they are hard enough to be used in building and all the purposes to which they may be applied.

The aforesaid composition, it is believed, may be placed in the molds in a dry state, or nearly so, provided a sufficiently strong power is employed in pressing them to cause an adhesion of the particles in that state.

What I claim as my invention, and desire to secure by Letters Patent, is—

The composition of marl and slaked lime, substantially in the proportions herein specified, for producing an artificial stone or a substitute for stone and bricks.

ST. JULIEN RAVENEL.

Witnesses:

J. S. BROWN,

S. H. SHAKSPEARE.